Patented Feb. 10, 1953

2,628,227

UNITED STATES PATENT OFFICE 2,628,227

WATER-SOLUBLE COMPLEX OF VITAMIN E AND PLASMA PROTEINS

Stanley R. Ames, Rochester, N. Y., assignor, by mesne assignments, to Eastman Kodak Company, Rochester, N. Y., a corporation of New Jersey No Drawing. Application May 12, 1949, Serial No. 92,967

6 Claims. (Cl. 260—121)

This invention relates to pharmaceutical compositions and to methods of making the same and is concerned especially with water-soluble biologically active compositions comprising normally fat-soluble vitamin-active materials.

Vitamin-active materials may be classified generally either as water-soluble or lipid- or fat-soluble materials. The fat-soluble vitamin-active materials include vitamin A, carotenes, vitamin D, vitamin E (tocopherols) and vitamin K. In the case of the fat-soluble materials it is often desirable to prepare aqueous solutions particularly for use in parenteral injections.

It is accordingly an object of this invention to provide for solubilizing normally fat-soluble biologically active material.

It is a further object of the invention to provide water-soluble compositions containing normally fat-soluble vitamin-active material.

Another object is to provide biologically active compositions suitable for parenteral injection.

Another object of the invention is to provide water-soluble tocopherol compounds.

A still further object of the invention is to provide means for economically and effectively forming water-soluble vitamin conjugates.

A still further object is to provide water-soluble biological antioxidants.

Other objects will be apparent from the description and claims which follow.

These and other objects are attained in accordance with this invention by conjugating vitamin-active material with a protein. I have found that normally fat-soluble materials such as the tocopherols, vitamin A and the like can be mixed with native proteins such as albumin, plasma and the like to form protein conjugates which are readily water-soluble, thus providing water-soluble vitamin concentrates of high potency suitable for administration by injection.

I have found that protein conjugates are readily prepared by effecting intimate contact between a protein in aqueous solution and the vitamin-active material. This is preferably effected in accordance with this invention by adding the vitamin-active material, such as $\alpha$-tocopherol, to an aqueous protein solution such as blood plasma and subjecting the resulting mixture to thorough mixing to effect intimate contact. The mixing is suitably effected in a homogenizer or similar homogenizing apparatus.

Alternatively, conjugation is effected in accordance with this invention by dissolving the vitamin-active material in an organic solvent which will not denature or coagulate an aqueous protein system and which is miscible therewith, such as acetone, dioxane and the like, and adding the resulting mixture with agitation to an aqueous protein system.

The exact nature of the protein-vitamin conjugate is not fully understood due to the complexity of protein systems. Complex formation is shown, however, by the increased intrinsic viscosity $[\eta]$ of the composition embodying this invention as compared to the protein alone as well as the increased inherent viscosity $\{\eta\}$ at finite concentrations. Further, when a composition comprising the conjugate of, for example, plasma protein and a tocopherol is fractionated with a salt, the tocopherol appears in all fractions. The compositions prepared in accordance with this invention contain in excess of 50 mg. per 100 grams of vitamin-active material with concentrations of 200–300 mg. or as much as 700 mg. per 100 grams or more being readily attained.

The invention is best understood with reference to preferred embodiments set out below.

Example 1

Ten ml. of a 5% aqueous solution of crystalline bovine plasma albumin were mixed with 10.1 mg. of pure d, $\alpha$-tocopherol in a homogenizer tube. The albumin employed was substantially lipid-free and contained no detectable tocopherol.

The resulting mixture was thoroughly homogenized in a Potter-Elvehjem homogenizer to give a slightly turbid solution. The solution was clarified by centrifugation in a refrigerated centrifuge.

The resulting supernatant solution contained 0.72 mg. of $\alpha$-tocopherol per ml. and the tocopherol amounted to 1.4% of the weight of total protein.

The relative viscosity of the protein-tocopherol composition was determined at varying concentrations in aqueous solution by means of an Ostwald viscosimeter. The inherent viscosity $\{\eta\}$ of the product was calculated according to the formula:

$$\{\eta\} = \frac{ln. \text{ relative viscosity}}{\text{concentration}}$$

The intrinsic viscosity $[\eta]$, which is independent of the concentration, was thereupon calculated by plotting the inherent viscosity $\{\eta\}$ against the concentration and extrapolating to infinite dilution.

A sample of the albumin alone was similarly tested. The inherent viscosity $\{\eta\}$ at varying dilution for albumin alone was substantially a straight line function, and its intrinsic viscosity [η] was 0.065.

The inherent viscosity {η} of the protein-to-copherol product embodying this invention, however, was higher at all concentrations than the albumin solution alone, and the composition had an intrinsic viscosity [η] of 0.12 due to conjugation of the albumin with the α-tocopherol. The conjugate when dehydrated was readily water-soluble.

Protein conjugates are readily prepared with any of the vitamin E-active tocopherol materials including α-tocopherol, β-tocopherol, γ-tocopherol and δ-tocopherol and acyl esters thereof such as the acetate, palmitate and the like, as well as other normally fat-soluble vitamin-active materials such as vitamin A, β-carotene and the like.

Any of the native proteins may be conjugated with the vitamin-active material and essentially lipid-free native proteins are eminently suited for practising the invention. Suitable protein materials include blood plasma, blood plasma fractions, reconstituted serum, egg albumin, crystalline bovine plasma albumin, and the like.

The protein material is preferably employed as a 5–10% aqueous solution for conjugation although higher or lower concentrations are suitable. The conjugates prepared in accordance with the invention can be dehydrated for storage and redissolved when needed.

*Example 2*

Another suitable method of preparing conjugates in accordance with this invention is to dissolve the vitamin-active material in a solvent which does not coagulate aqueous proteins and which preferably is water-miscible, and stir the solution of vitamin-active material into an aqueous protein solution.

For example, α-tocopherol was dissolved in dioxane to give a solution containing 9.2 mg. of tocopherol per ml. of solution. One ml. of the tocopherol solution was slowly added with stirring to 10 ml. of bovine plasma. The resulting slightly turbid solution was centrifuged at 3500 R. P. M. for 20 minutes in a refrigerated centrifuge. The supernatant solution contained 0.37 mg. of α-tocopherol per ml. and the tocopherol amounted to about 0.5% of the weight of protein. The dioxane was removed by evaporation.

Thus, by means of this invention water-soluble vitamin-active compositions of high potency are readily prepared. The compositions prepared are suitable for intravenous or intramuscular injection. The compositions may be added directly to enzymatic systems and furnish vitamins thereto in solubilized form.

While the invention has been described in considerable detail with reference to certain preferred embodiments thereof, it will be understood that variations and modifications may be effected within the spirit and scope of the invention as described heretofore and as defined in the appended claims.

What I claim is:

1. A concentrated vitamin E-active composition comprising a substantially lipid-free plasma protein conjugated with a tocopherol, said composition being water-soluble and having an intrinsic viscosity in aqueous solution greater than the intrinsic viscosity of said substantially lipid-free plasma protein in aqueous solution before conjugation, said tocopherol being present in an amount in excess of 50 mg. per 100 grams of said composition, said composition having been obtained by effecting intimate contact between a substantially lipid-free plasma protein in aqueous solution and a tocopherol, said intimate contact having been effected by subjecting an aqueous solution of said protein to one of the steps of homogenizing said tocopherol with said aqueous solution and admixing said aqueous solution with a solution of tocopherol in an organic solvent which is miscible with said aqueous solution and substantially free of denaturing and coagulating effect on aqueous solutions of protein.

2. A concentrated water-soluble vitamin E-active composition comprising a substantially lipid-free plasma protein conjugated with α-tocopherol, said α-tocopherol being present in an amount in excess of 50 mg. per 100 grams of said composition, said composition being characterized in aqueous solution by an intrinsic viscosity greater than the intrinsic viscosity of said substantially lipid-free plasma protein in aqueous solution before conjugation, said composition being the product obtained by homogenizing a mixture of said α-tocopherol and an aqueous solution of said plasma protein.

3. A concentrated water-soluble vitamin E-active composition comprising a substantially lipid-free plasma protein conjugated with α-tocopherol, said α-tocopherol being present in an amount in excess of 50 mg. per 100 grams of said composition, said composition being characterized in aqueous solution by an intrinsic viscosity greater than the intrinsic viscosity of said substantially lipid-free plasma protein in aqueous solution before conjugation, said composition being the product obtained by admixing an aqueous solution of said plasma protein with said α-tocopherol and an organic solvent which is miscible with said aqueous solution of said protein but substantially free of denaturing and coagulating effect on aqueous protein.

4. A concentrated water-soluble vitamin E-active composition comprising a substantially lipid-free plasma protein conjugated with α-tocopherol, and α-tocopherol being present in an amount in excess of 50 mg. per 100 grams of said composition, said composition being characterized in aqueous solution by an intrinsic viscosity greater than the intrinsic viscosity of said substantially lipid-free plasma protein in aqueous solution before conjugation, said plasma protein having been conjugated with said α-tocopherol by admixing an aqueous solution of said plasma protein with a solution of said α-tocopherol in dioxane.

5. A concentrated vitamin E-active composition comprising substantially lipid-free bovine plasma conjugated with α-tocopherol, said α-tocopherol being present in an amount in excess of 50 mg. per 100 grams of said composition, said composition being water-soluble and having an intrinsic viscosity in aqueous solution greater than the intrinsic viscosity of said bovine plasma in aqueous solution, said bovine plasma having been conjugated with said α-tocopherol by homogenizing a mixture of an aqueous solution of said bovine plasma with said α-tocopherol.

6. A concentrated vitamin E-active composition comprising substantially lipid-free bovine plasma conjugated with α-tocopherol, said α-tocopherol being present in an amount in excess of 50 mg. per 100 grams of said composition, said composition being water-soluble and having an intrinsic viscosity in aqueous solution greater than the intrinsic viscosity of said bovine plasma in aqueous solution, said bovine plasma having been conjugated with said α-tocopherol by admixing an aqueous solution of said bovine plasma with a solution of said α-tocopherol in dioxane.

STANLEY R. AMES.

REFERENCES CITED

The following references are of record in the file of this patent:

UNITED STATES PATENTS

| Number | Name | Date |
|---|---|---|
| 2,194,188 | Supplee | Mar. 19, 1940 |
| 2,299,929 | Raynolds | Oct. 27, 1942 |
| 2,300,410 | Ferrari | Nov. 3, 1942 |

OTHER REFERENCES

Rosenberg: "Chemistry and Physiology of the Vitamins" (Interscience Publishers, New York, 1945), page 456.

Chem. Abstracts, vol. 36, page 5222$^8$ (1942) (Abstract of article by Schormuller in Reichs-gesundheitsblatt, 1940, pp. 809–825).

U. S. Dispensatory, 24th edition (1947), page 1770–V.